Feb. 23, 1926.

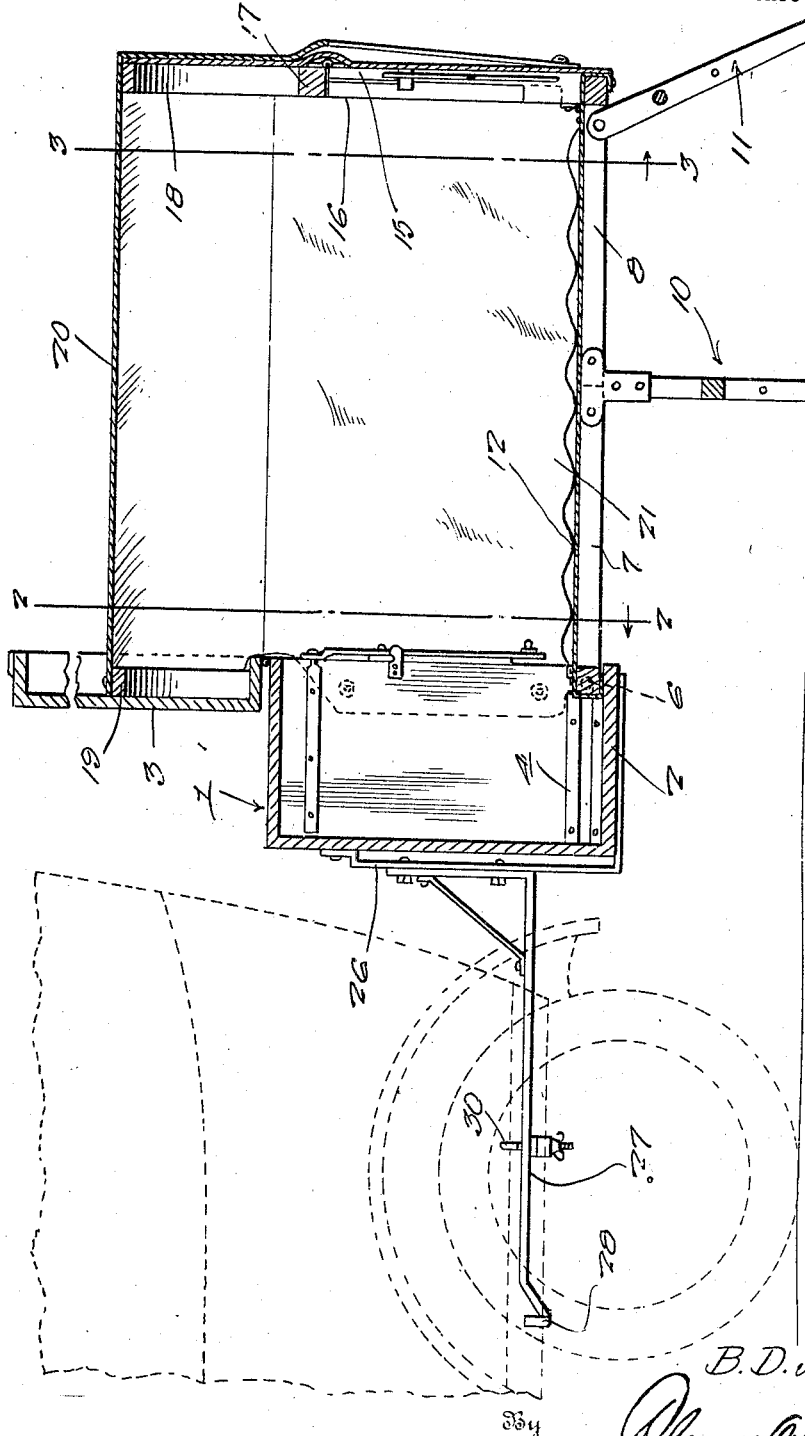

B. D. MANNING

AUTOMOBILE BED

Filed April 8, 1925

Inventor
B. D. Manning

By Clarence O'Brien
Attorney

Feb. 23, 1926.

B. D. MANNING

AUTOMOBILE BED

Filed April 8, 1925

Inventor
B. D. Manning

Patented Feb. 23, 1926.

1,574,434

UNITED STATES PATENT OFFICE.

BENJAMIN D. MANNING, OF DECORAH, IOWA.

AUTOMOBILE BED.

Application filed April 8, 1925. Serial No. 21,588.

*To all whom it may concern:*

Be it known that I, BENJAMIN D. MANNING, a citizen of the United States, residing at Decorah, in the county of Winneshiek and State of Iowa, have invented certain new and useful Improvements in Automobile Beds, of which the following is a specification.

This invention relates to an improved automobile bed, that is, a device of this kind which includes a portable bed adapted to be mounted upon the automobile, and capable of being folded to a compact condition when carrying the same, but also adaptable for being extended for use and thereby to render the device highly desirable for use by tourists.

Briefly, the invention comprises a box or the like, which is adapted to be rigidly supported on the rear end of the automobile, by means which will equally distribute the weight of the device upon the chassis bar. The box is provided with a swinging closure which, when in position, serves to cooperate in forming a tent. The device also embodies a foldable cot capable of being properly suspended in a horizontal position for use, at which time the box serves as a support for one end of the same. All of these parts may be compactly folded into the box in a permanent assembled condition, ready to be erected for use whenever desired or necessary. The structural features and advantages derived from their use will become apparent from the following description and drawings.

In the accompanying drawings, forming a part of this specification, and in which like numerals are employed to designate like parts throughout the same:

Figure 1 is a central vertical longitudinal section, with parts in elevation, showing a device constructed in accordance with the present invention, the parts being in position for use.

Figure 2 is a transverse section, taken approximately upon the line 2—2 of Figure 1, looking in the direction of the arrow.

Figure 8:
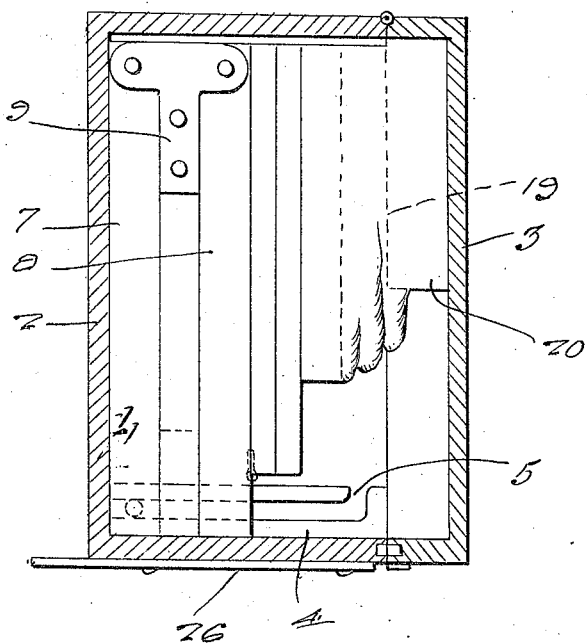
Figure 8 is a central vertical section, showing the box closed and the canopy and cot folded therein.
Figure 7:
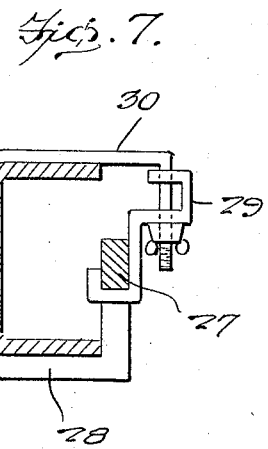
Figure 4:
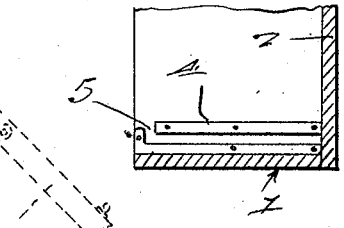
Figure 4 is a detail sectional view.

Referring to the drawings in detail, the reference character 1 designates generally the box which comprises a relatively stationary section 2 and a hinged cover 3. The cover, as shown in Figure 2 is provided with spring hinges, the normal tendency of which is to swing the cover automatically to open position. Secured to the opposite vertical side walls of the stationary section 2 at the bottom thereof are guide members 4 having entrance openings 5 at their outer ends, as is more plainly shown in Figure 4. These guides are adapted to receive studs 6, carried by the inner section 7 of a foldable cot frame. The remaining section 8 of the frame is connected to the first named section, through the medium of appropriate means 9, which means also serve as a connecting means for the main supporting leg structure 10. In addition, the cot is provided at its rear or outer end with a folding prop 11, capable of being folded between the side rails of the frame structure 8. The leg structure 10 is intended to be disposed between the two sections of the cot when the same is in folded condition as is shown in Figure 8. The cot is, of course, provided with a canvas covering 12 which is stretched sufficiently taut to provide for desirable comfort.

Figure 3:
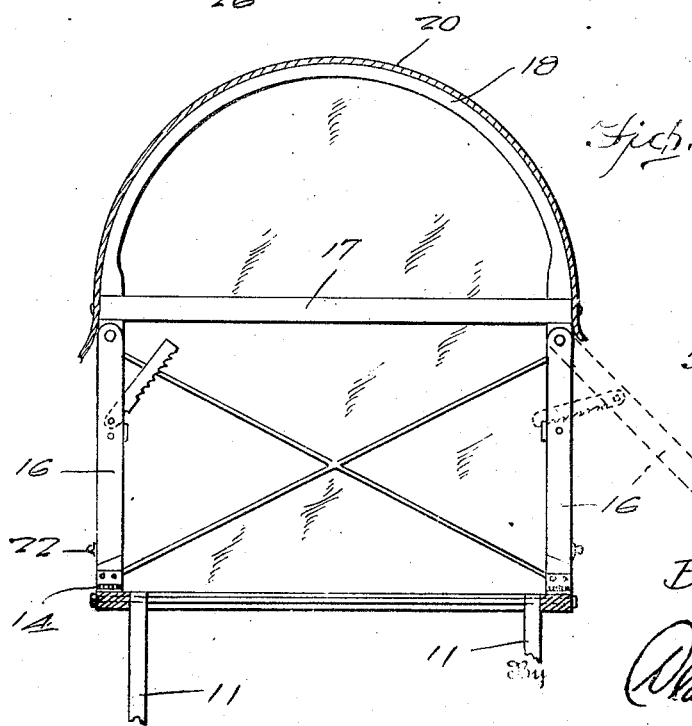
Figure 3 is a similar view, taken on the line 3—3 of Figure 1, looking rearwardly.

In Figures 1 and 3, an end frame is hinged, as at 14, to the section 8 of the cot frame, and is intended to extend vertically at right angles with respect thereto, when the device is in use. This frame is composed of a pair of vertical uprights 15, upon which arms 16 are pivotally mounted at their upper ends, the upper portion of the frame embodying a cross piece 17, and an arched bow 18. This cross piece and bow are hingedly mounted upon the upper end of the uprights 15 and are maintained in vertical alignment with the latter through the medium of appropriate spring means. When disposed vertically as shown in Figure 1, these parts 17 and 18 are disposed on a plane above the top of the box. At this time, however, the cover 3 is swung to the open position as shown, and it will be seen that this cover is provided on its inner face with another arched bow 19. The canvas 20 forming a canopy overlying the cot is connected with these arched bows and the hinged frame at the rear end of the cot to form a tent. The sides 21 of the tent are free to swing, but in practice will be provided with appropriate snap fasteners for cooperation with the complemental portions 22 to hold them snugly down to prevent wind and rain from blowing into the tent. These sides, however, are capable of being supported in the inclined positions as shown in Figure 2, wherein it will be seen that the arms 16 are swung outwardly and are maintained in such position by appropriate pivoted supports 23, also pivotally mounted to permit the necessary folding to render the structures compact as possible. Cooperating with the arms 16 to maintain the tent side walls in this position, are substantially duplicate arms 24 held out by the members 25.

Figure 7:
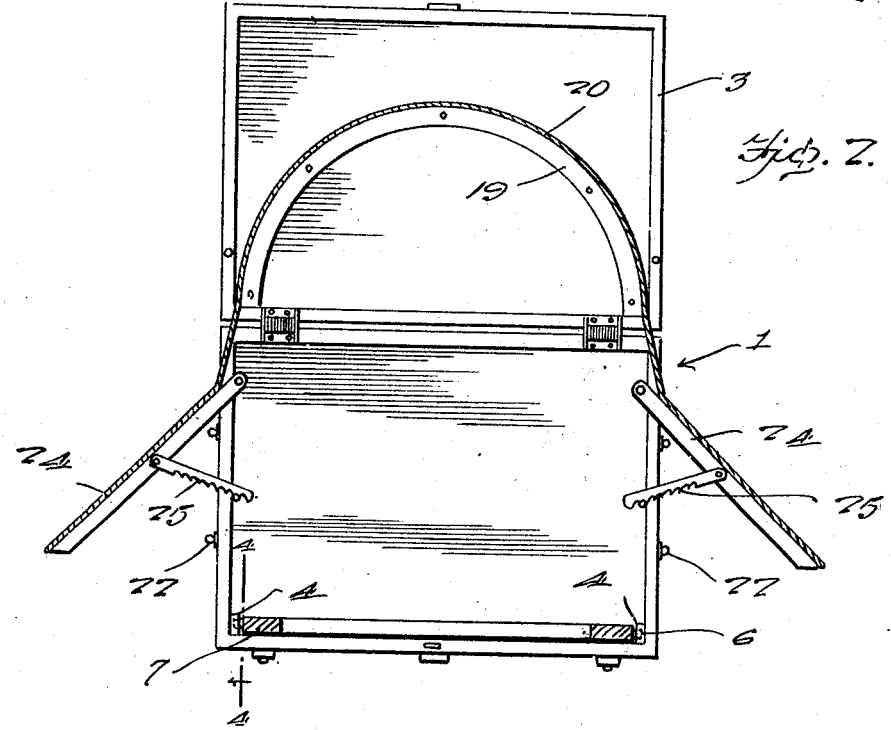
Figure 7 is an enlarged detail view of the clamping device of said suspension means.
Figure 5:
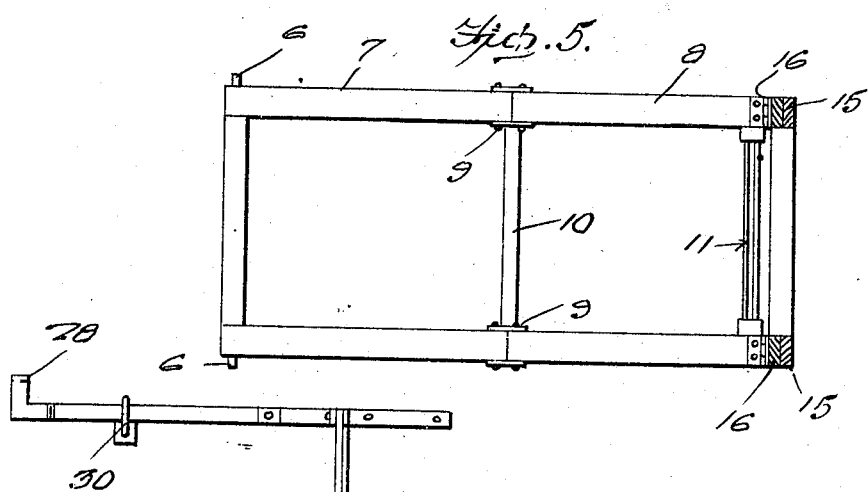
Figure 5 is a top plan view of the sections forming the top.
Figure 6:
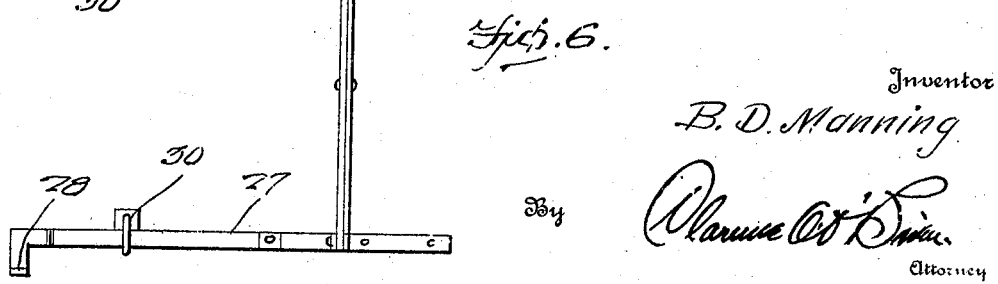
Figure 6 is a top plan view of the suspension and connecting means for the box.

It will be noted that the box is provided with metal strips 26 on one side and that attaching arms 27 are fastened to these and are adapted to extend beneath the body of the automobile, these arms having outwardly and angularly directed free ends 28 to engage beneath the chassis bars of the automobile, as more plainly shown in Figure 7. An appropriate clamp 29 is also associated with the arm 27 and includes a hook 30, to take over the top of the channel bar of the automobile.

From the foregoing description, it will be seen that under normal conditions, the cover of the box is closed, as shown in Figure 8, with the top folded in three parts, in the forward portion of the box. Upon releasing the cover, however, it will, under the section of the spring hinges, automatically swing to the vertical position shown in Figure 1. Now, the cot can be pulled out to assume the horizontal position shown, and the legs and props swung down to support it in the position shown. The sides 21 of the tent may be left to hang down and fastened in place, or they may be arranged in the inclined position shown in Figure 2, and held by the arms 24 and 16 as before described.

It is thought that the foregoing description, taken in connection with the accompanying drawings will enable persons skilled in the art to which the invention relates, to obtain a clear understanding of the same. Therefore, a more lengthy description is thought unnecessary.

Although the preferred embodiment of the invention has been shown and described, it is to be understood that minor changes coming within the field of the invention may be resorted to, if desired.

I claim:

1. In a structure of the class described, a box adapted to be supported on the rear end of a vehicle, a hinged cover for said box, said cover being adapted to swing upwardly, a foldable cot structure in said box adapted to be extended therefrom in a horizontal plane to position it for use, a frame structure hingedly connected to the rear end of said cot structure, said frame structure including a top bow, and a second bow fastened to the cover of said box, and a canvas fastened to said bows and adapted to be stretched to provide a canopy to overlie said cot.

2. In a structure of the class described, a box adapted to be mounted on the rear end of a vehicle, said box embodying a pivotally mounted automatically elevated upwardly swinging cover, a foldable cot structure adapted to be contained in a folded condition in said box when not in use, said structure being intended to be disposed in a horizontal extended position when in use, said box constituting a support for the inner end of the cot, and the cot being slidably connected thereto at its inner end, and a canopy for said cot, the forward portion of the canopy being permanently fastened to said cover, whereby to permit said cover to function as a means for maintaining the forward portion of the canopy in erected position and as an inner end wall for the canopy, the rear end of the canopy being connected to the corresponding end of said cot structure.

3. In a structure of the class described, a box adapted to be supported upon a vehicle, said box being open on one side, a spring elevated upwardly swinging cover for said open side, a foldable cot slidably connected at its inner end in said box, a vertically disposed end frame connected to and rising from the outer end of said cot, said end frame being foldable down upon said cot, supporting means for the cot, and a canopy connected at its inner end with the aforesaid cover and at its opposite end with said end frame, said cover serving to stretch and hold said canopy in usable condition.

4. A bed structure of the kind specified comprising a box adapted to be mounted upon a vehicle, said box being open on its rear side, a pair of guide members fastened to the opposed side walls of said box, a cover hingedly connected to the top wall of the box, spring means for automatically swinging the cover upwardly to vertical right angular position, a cot structure, the inner end of which is slidably connected with said guide members, said cot structure being foldable into compact form and embodying supporting means, an end frame hingedly connected to the outer end of the cot structure and adapted to extend vertically at right angles above the same, said end frame being made up of hingedly connected sections, and a canopy connected at its forward end with said cover, and at its opposite end with said end frame, and arched bows in association with the cover and end frame for arching the top of said canopy.

In testimony whereof I affix my signature.

BENJAMIN D. MANNING.